Feb. 29, 1944.    T. C. POULTER    2,342,890
METHOD AND APPARATUS FOR FLUID CONTROL
Filed Feb. 17, 1941    4 Sheets-Sheet 1
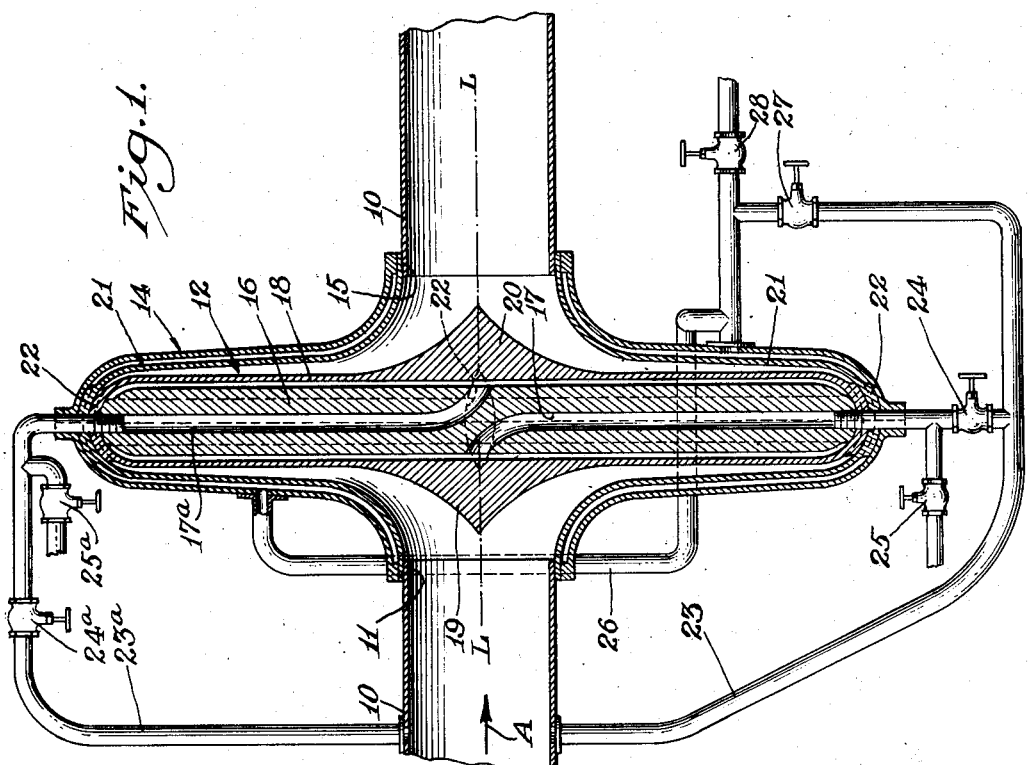
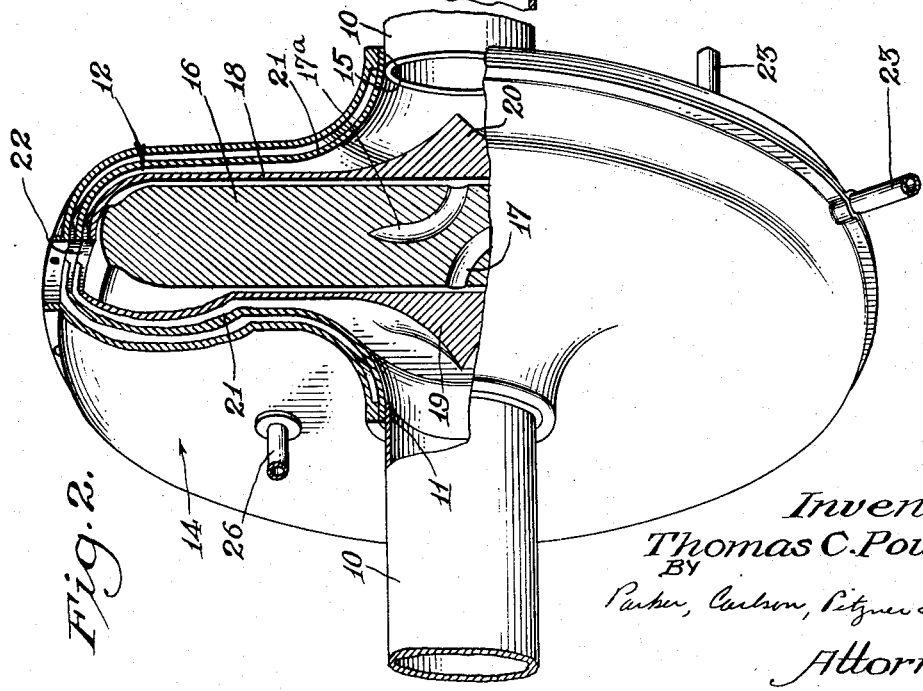
Inventor
Thomas C. Poulter
BY
Parker, Carlson, Pitzner & Hubbard
Attorneys.

Feb. 29, 1944. T. C. POULTER 2,342,890
METHOD AND APPARATUS FOR FLUID CONTROL
Filed Feb. 17, 1941 4 Sheets-Sheet 3
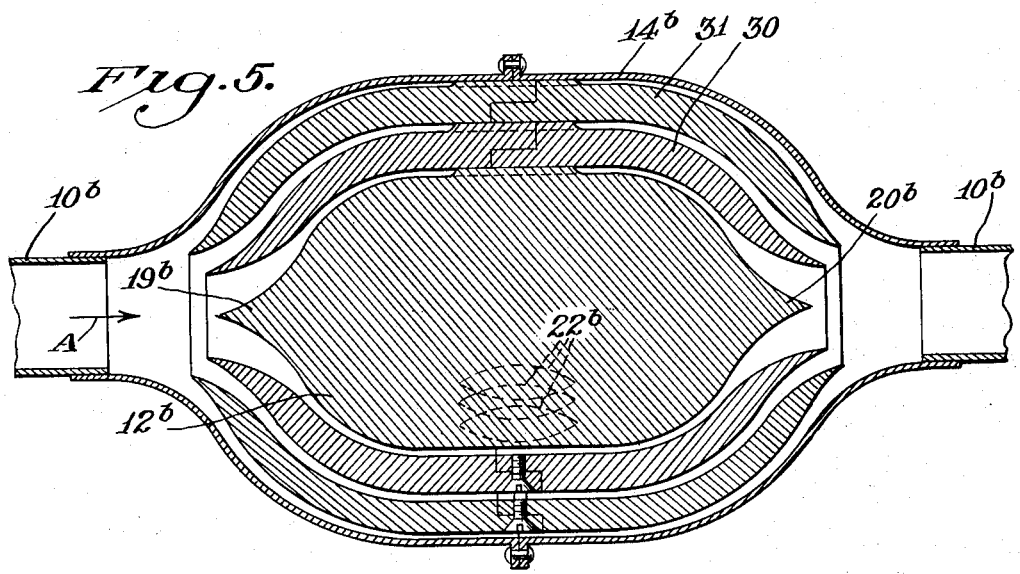
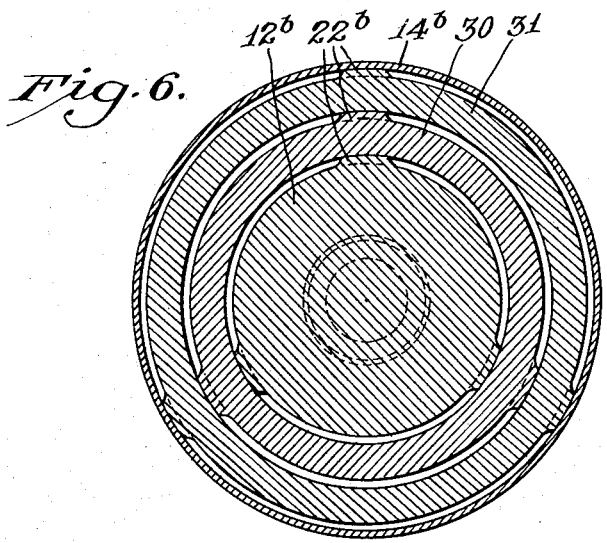
Inventor
Thomas C. Poulter
BY
Parker, Carlson, Pitzreve Hubbard
Attorneys Feb. 29, 1944.  T. C. POULTER  2,342,890
METHOD AND APPARATUS FOR FLUID CONTROL
Filed Feb. 17, 1941  4 Sheets-Sheet 4
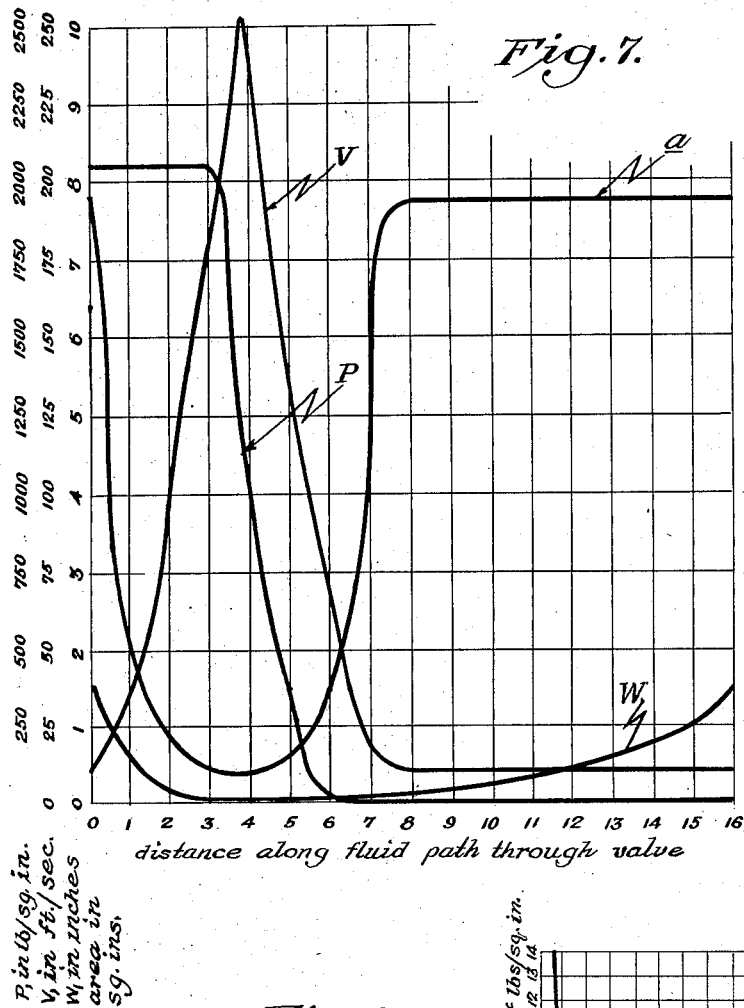
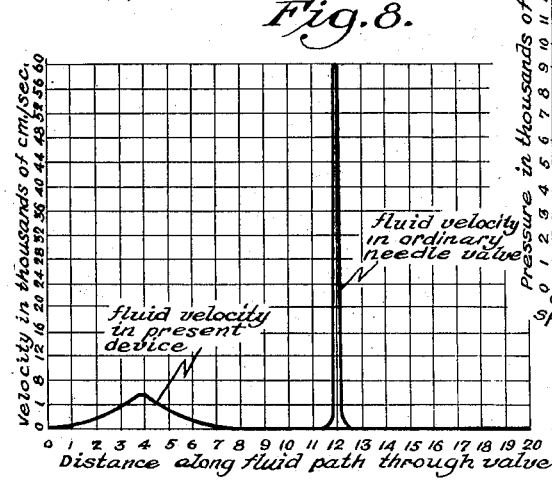
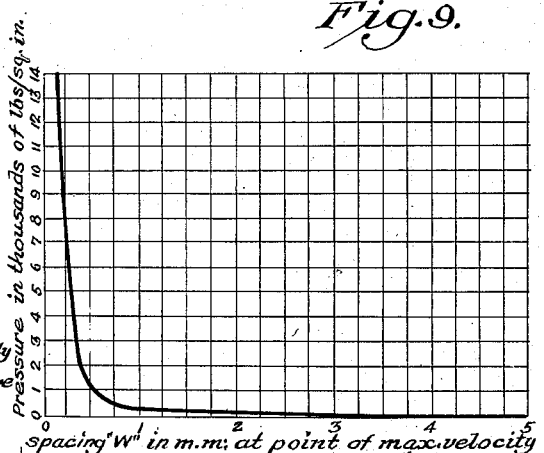
Inventor
Thomas C. Poulter
BY
Attorneys.

Patented Feb. 29, 1944

2,342,890

UNITED STATES PATENT OFFICE 2,342,890

METHOD AND APPARATUS FOR FLUID CONTROL

Thomas C. Poulter, La Grange, Ill.

Application February 17, 1941, Serial No. 379,384

9 Claims. (Cl. 138—46)

The present invention relates to a novel method and apparatus for fluid control, control devices embodying the invention being adapted for use primarily either as fluid pressure reducers or as fluid delivery rate adjusters.

There are many potential fields of application for the present invention. In fact, they are so many and so divergent that a comprehensive list is out of the question for present purposes. Simply by way of example, and in order to make clear some of the problems involved, it may be noted that in steam operated electric generating plants today it is common to provide a single feed water pump for supplying water to several boilers. In such installations the water is fed through distributing valves which maintain the proper water levels in the respective boilers. As the feed water pump has a constant delivery rate it is desirable to use a device of the type herein contemplated to return the excess water, in the event of light boiler demand, to an atmospheric-pressure water reservoir. This may entail dropping the water pressure through the device by, say, 1,500 pounds per square inch and for large volumes of water it is obvious that the service is of a very heavy duty character. More particularly, if it is necessary to make such a pressure reduction for, say, 100,000 pounds of water per hour then approximately 520 horsepower must be absorbed by the pressure reducer.

Another instance in which a device of the type herein disclosed may be used is as a throttling device in the supply line of a large capacity steam driven prime mover in order to control the delivery of steam. Similarly, my method and apparatus may be used to reduce the steam pressure in a steam supply line to a low pressure prime mover which is fed from a high pressure boiler that normally feeds steam to a high pressure prime mover, the latter ordinarily being arranged to exhaust to the first mentioned low pressure prime mover. In other words, if the high pressure prime mover of such as system has to be cut out of service then the steam will have to be fed directly from the high pressure boiler to the low pressure prime mover and in such case a pressure reducer of the type herein disclosed may be used in effecting the necessary reduction of pressure to the low pressure prime mover.

Heretofore, the pressure reducing or throttling valves for the type of service indicated above, have had quite a short, useful life. They have been of several types, one of the best known being the so-called needle valve type. All of them, however, have had the characteristic that the water, steam or other fluid is forced through them at extremely high velocity. As a consequence, seriously damaging cavitation erosion sets in. As a matter of fact, the velocities have been so extreme in the prior devices that it is more of a wonder that they displayed as long a useful life as they did rather than that they failed so quickly. As to the phenomena of "cavitation erosion" it should be borne in mind that as a high velocity fluid impinges upon the valve parts, or lower velocity portions of the fluid itself, a void or cavity is produced in the fluid. Such cavities may be produced in the fluid as two adjacent particles of fluid pass one another and move in opposite directions or by the centrifugal force in a small, rapidly swirling eddy current in the fluid. These cavities soon collapse and as they do so the local fluid pressure, in the immediate vicinity of the collapsed cavity, reaches an exceedingly high value of the order of many thousands of pounds per square inch. Whenever there is such a sudden burst of pressure in fluid contacting, or in close proximity to, a metal surface, the fluid is forced into the metal in a compressed condition and then as the pressure is subsequently released the expanding fluid breaks out of the metal carrying with it tiny fragments of the metal. Even if a cavity collapses out in the body of the fluid away from a metal wall a compression wave is set up which travels through the fluid at about 5,000 feet per second and when it strikes the metal surface, the latter being stationary and unable to follow the fluid's motion, cavitation again occurs and fluid is driven in compressed form into the metal, thereafter tearing away fragments as it subsequently escapes. Fluid compression of the type just described occurs even in what are commonly known as uncompressible fluids such as water. As the action described continues, the metal valve parts are eaten away due to the cavitation erosion and the valve is finally completely disabled.

One general aim of the present invention is to provide a novel method and apparatus for fluid control, of such character that cavitation erosion during operation, even in the case of very heavy duty service, is substantially completely eliminated. In attaining this object I have evolved a method and apparatus which fall in an entirely different class from those heretofore available. This novel method and apparatus, which I have herein disclosed, may, for convenience be denominated as being of a "low velocity" type since they make possible large pressure reductions in even heavy duty installations without ever permitting the fluid velocity to exceed a few hundred feet per second, an operational characteristic that was heretofore quite impossible with the pressure reduction or throttling devices available.

Another object of the invention is to provide a fluid control device of the class indicated which will not only have a long useful life for even heavy duty service but which is also especially quiet in operation. Still another object is to provide a low velocity type fluid control device embodying a novel arrangement for adjusting the pressure drop or change in delivery rate which it effects.

Further objects and advantages of the invention will become apparent as the following description proceeds, taken in connection with the accompanying drawings in which:

Figure 1 is a longitudinal sectional view of a fluid control device embodying the invention, and adapted to carry out the herein disclosed method, the associated control apparatus for the device being shown generally diagrammatically.

Fig. 2 is a perspective view of the device of Fig. 1 with a portion of the casing broken away to expose the interiorly located parts.

Fig. 5 is a longitudinal sectional view of a second modified form of pressure reducer embodying the invention.

Fig. 6 is a transverse sectional view of the reducer of Fig. 5.

Fig. 7 is a set of characteristic curves for the device of Fig. 1.

Fig. 8 is a comparison chart contrasting the fluid velocity encountered in the device of Fig. 1 as compared to that in an ordinary needle valve.

Fig. 9 is a characteristic chart indicating the changes in fluid pressure resulting from variations in width of the fluid path through the valve at the point of maximum velocity.

Figure 3:
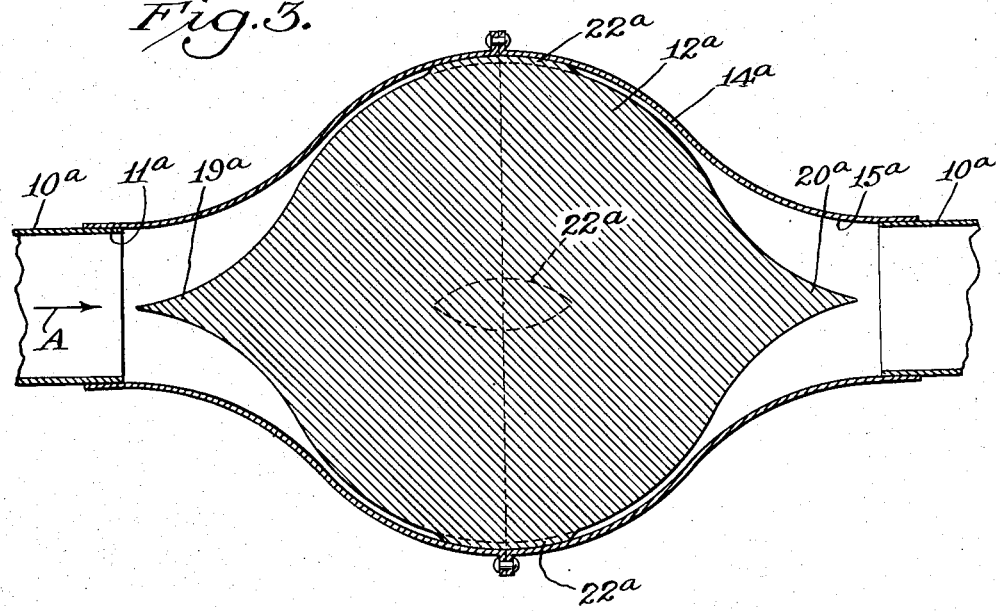
Fig. 3 is a longitudinal sectional view of a modified form of pressure reducer embodying the invention.

While the invention is susceptible of various modifications and alternative constructions and application, I have shown in the drawings and will herein describe in detail certain preferred embodiments and applications, but it is to be understood that I do not thereby intend to limit the invention to the specific forms and methods disclosed, but intend to cover all modifications, alternative constructions and methods falling within the spirit and scope of the invention as expressed in the appended claims.

Pressure reduction or throttling of a stream of fluid entails, from the very nature of the operation, a dissipation of a portion of the potential energy or pressure head of the fluid. In general, I contemplate effecting this dissipation by spreading a confined stream of fluid in a thin sheet, while still retaining it confined, whereby greatly to increase the skin friction on the fluid as compared to its flow through a pipe, and thereafter restoring the fluid to a stream of compact cross sectional form. The skin friction on the thinly spread fluid converts the desired portion of the fluid's pressure head into heat which is in turn dissipated, being carried away by warming of the stream of fluid itself in my presently disclosed apparatus.

The skin friction mentioned is a function of not only the area of the confining structure contacted by the fluid but also of the fluid velocity. In a needle valve the area, in question, is fairly small, but the velocity is extremely high. In contrast, I utilize a much larger area by spreading the fluid in a thin sheet, but limit the velocity to a low value. There is much more involved, for successful operation, however, than simply maintaining a low velocity for the fluid. I have discovered that, in order successfully to substantially eliminate cavitation erosion it is requisite that the following five conditions be adhered to in operating on the fluid in reducing its pressure in the general manner noted above, viz:

(1) The maximum velocity of the fluid must not be permitted to exceed a few hundred feet per second.
(2) The velocity changes effected in the fluid should be such as correspondingly to change the kinetic energy of the fluid at a substantially uniform rate or, in other words $$\frac{dv^2}{dt}$$

must be equal substantially to a constant.
(3) The velocity of the fluid at the point where the fluid pressure has been reduced to the desired final or minimum value for the downstream side of the device should be substantially equal to the velocity of the fluid at such downstream side of the device.
(4) There must be no sudden decrease in the velocity of the fluid and, in fact, the rate of decrease in velocity must never exceed a value such that the change in velocity head exceeds the pressure head.
(5) There must be no sudden change in direction of the fluid and, in particular, any curvature of the fluid path must be of sufficiently great radius that the resultant centrifugal force acting on the fluid at any point does not exceed the fluid pressure at such point.

I have determined that when the five critical conditions prescribed above are imposed that the characteristics of the control device can be fairly accurately expressed by the comparatively simple equation:

$$\frac{dP}{ds} = KW^{-1.3}V^{1.7}$$

where P is the pressure, s is the distance along the path of flow of the fluid from the entrance of the control device to the point in question, W is the width of the confined clearance in the device at such point and through which the fluid flows, V is the velocity of the fluid at the point in question, and K is a constant for the particular fluid at a given temperature, being substantially 0.0000355 for water at 100° C. It will thus be seen that the expression just set forth above makes it possible to determine the width W of the clearance spacing for the fluid, in a skin resistance type of fluid control device such as herein contemplated, at all points along the path of travel of the fluid, which is requisite to obtain a desired over-all pressure drop with a preselected distribution of fluid velocity throughout the device. To put it another way, having postulated the amount of fluid to be handled, the entrance velocity of the stream, the over-all pressure drop desired and the distribution of fluid velocities desired in the course of the pressure reducing operation, the foregoing equation can be readily used to ascertain the requisite width of the clearance in the reducer at all points in it, thereby accurately determining its requisite dimensions for operation without cavitation erosion. The various forms of fluid control devices described below are all especially adapted to operate in accordance with the requirements outlined above.

The first exemplary fluid control device herein shown (Figs. 1 and 2) has been illustrated as interposed in a pipe 10 to effect a reduction in pressure of a stream of fluid flowing through the pipe in the direction of the arrow A, though without substantially reducing the delivery rate of the fluid. In brief, the construction is such that a stream of liquid entering through the inlet 11 is spread out laterally in a thin sheet over a core 12 disposed within a complementally shaped casing 14, and the liquid is then recombined in an exit stream at the outlet 15. The frictional resistance to flow of the liquid is greatly increased as it passes in a thin sheet over the core, as compared to that in the pipe 10, because of the greater length of the peripheral boundary of the cross sectional area of the space through which the liquid flows, and a large part of the potential energy or pressure head of the liquid is thus dissipated in heat. There is, in fact, so large a surface area involved that the reduction in cross sectional area of the fluid path through the device, as compared to that in the pipe 10, can be a minimum and thereby produce the desired pressure drop without the necessity of building up excessive velocities.

In the instant construction the core 12 comprises a cast metal body 16 which is of disk shape and has a deeply rounded peripheral edge. In conformity with the fifth critical condition set out above the curvature of the fluid path about the core is such that the resultant centrifugal force on the fluid never exceeds its pressure, or to express it mathematically:

$$\frac{Mv^2}{Ra} \leq P$$

where M is the mass, v the velocity and P the pressure of the fluid, R the radius of curvature and $a$ is the cross sectional area. This core body 16 is covered by a metal sheath 18 whose end walls can be bulged or sprung laterally from the core body in the manner of diaphragms, for a purpose which will appear hereinafter. Protrusions 19 and 20 are provided on the respective opposite end walls of the sheath 18 and project, respectively, into the inlet and outlet 11 and 15. The protrusions 19, 20 are smoothly tapered (see Fig. 1) from the end-surfaces of the sheath 18, from which they rise, to points which are coaxial with each other and with the longitudinal axis L—L of the device. The inlet 11 and outlet 15 are also coaxial with the axis L—L. From the foregoing it will be seen that the core structure 12 is symmetrical about the longitudinal axis L—L of the device and that its exterior surface is a surface of revolution, of a smooth and uninterrupted curve, about this axis.

The casing 14, which encloses the core 12, is complemental in shape to the latter. It may, for ease of assembly, be formed in two halves, mating in a plane passing transversely through the center of the device, these halves being rigidly secured together as indicated. The interior surface of the casing 14 closely follows the contour of the exterior of the core 12 and is, in general, spaced therefrom so as to form an annular clearance space between the casing and core, through which the liquid flows and which is dimensioned so that this clearance W will accord at all points with the key formula set out above. The process of so dimensioning this clearance space is further explained below. In the present instance the casing 14 is double walled so that a chamber 21 is formed between its inner and outer walls for a purpose which will appear below.

To support the core structure 12 in proper position within the casing 14, a plurality of bosses 22 are provided on the perimeter of the core (Fig. 2). These bosses are of streamlined shape so as to avoid setting up any turbulence in the liquid which flows past them.

Particularly to be noted, in connection with the structure described above, is the streamlined form of the clearance space between the core 12 and casing 14 through which the liquid flows in the device. In other words, this clearance space or path for the liquid is entirely free of any angular or sharp turns or bends or any other contours which would set up turbulence in the liquid. Accordingly, there are no eddies or swirls which would cause localized high velocity peaks in the liquid.

Turning now to the matter of the critical dimensioning of the clearance space of the device shown in Figs. 1 and 2, and through which the fluid passes, reference may be made to the exemplary sets of characteristic curves in Fig. 7 in the course of the following explanation. As is apparent from these curves the pressure drop is all accomplished in the first half of the device or, in other words, prior to the time the fluid reaches the point of largest peripheral diameter on the core 12. The following or second half of the device serves simply to recombine the fluid in stream form, without turbulence. It is desirable that the pressure reduction be effected in the first half of the device because, as the pressure reduction progresses, the fluid velocity first increases and subsequently decreases so that the velocity is low when the pressure reduction is nearly complete. On the other hand, effectual pressure reduction at extremely low velocities requires a large surface or skin friction area for the fluid. Since such area is a maximum at the midway point of the device, I construct it so that the pressure reduction will be completed in the first half of the device and the large area at the midway point of the device will thus be washed by fluid traveling at the low velocity incident to substantial completion of the pressure reduction operation.

In dimensioning the clearance in the device for a particular service we must first of all postulate the pressure reduction to be effected, the amount of fluid to be handled, and the delivery velocity of the fluid to the device. In the case of water the latter velocity will be about 10 feet per second, a normal value ordinarily used and which is low enough to avoid difficulty with the customary pipe fittings encountered in a water system. Knowing the quantity of fluid to be delivered (water assumed in this example) and the entrance and exit velocity (these terminal velocities are desirably equal) we can readily calculate the cross sectional area $a$ of the device at its inlet and outlet, i. e., the value of curve $a$ at its two extremities in Fig. 7. Before completing the area curve $a$ we must lay out the velocity curve V. As to the latter we have previously postulated the inlet and outlet velocities and have also determined that the pressure reduction should be complete at the midway point of the device. Hence, it follows from primary condition 3 above that the velocity must also be equal to the exit value at the midway point. This means that the peak velocity must be between the inlet and midway point of the device, and by primary condition 1 it must be of the order of only a few hundred feet per second. In the example shown in Fig. 7 the peak velocity has been shown as substantially 256 feet per second. Primary condition 2 above determines the slope of the velocity curve to its peak value. Thus, with these data at hand we may lay out the velocity curve as shown.

Having determined the fluid velocity at all points through the device as above it now requires but a simple calculation to complete the layout of the area curve $a$, since the area and velocity determine the quantity or rate of fluid flow, which is constant throughout.

Next, the curve for W, the highly critical width of the clearance space for fluid flow through the device, is at least tentatively laid out. This can be done by assuming a tentative set of dimensions for the core 12, the cross sectional area $a$ for the clearance space having been previously calculated as above. Knowing the radius of the core surface at any point and the cross sectional area of the clearance at such point on its surface it is, of course, but simple arithmetic to determine the requisite width or spacing W to the opposed inner face of the casing 14.

Having laid out three of the four curves in Fig. 7 as above, we proceed to calculate the curve P for the pressure. We have, of course, postulated the initial and final values and have further determined that the pressure drop should be complete at the midway point in the value. The intermediate points are determined by the key equation $$\frac{dP}{ds} = KW^{-1.7}V^{1.3}$$

The integrated value of the incremental pressure drops is determined and we see if it totals up to the required over-all pressure drop. If not, then suitable adjustment is made in the dimensions of the core 12, to effect a corresponding required change in W. Care is also taken to see that primary conditions 4 and 5 are adhered to in the final set of characteristics. Though in explanation the calculations seem somewhat involved they are in actuality fairly simple, once the basic critical conditions are set forth as above.

With a device constructed as set forth above great volumes of fluid can be handled to effect extreme reductions in pressure without damage to the device over a long period of time. In fact, cavitation erosion is substantially completely eliminated. One should not be misled, because of the scale for the velocity curve V in Fig. 7, as to the value of peak velocity encountered. That it is very low indeed, compared with the fluid velocity in an ordinary needle valve, will be seen upon reference to Fig. 8, where the fluid velocities in my device and in a needle valve are directly compared. In the latter the fluid velocity is equal in magnitude to that of a high powered rifle bullet. From this will be apparent the strikingly different operational characteristics of my device as compared to those of devices heretofore available.

Provision is made in the instant device for controllably varying the width of the clearance space in the device through which the liquid flows, and, hence, for controlling the rate of fluid delivery or the magnitude of pressure reduction. Thus as the clearance is reduced the delivery rate is also reduced, the pressure drop sharply increased, and the fluid velocity is increased in that section of the device in which the cross sectional area of the clearance is decreased. That the device is extraordinarily critical to changes in the clearance width W at the point of maximum fluid velocity in the device will be clear from an inspection of Fig. 9. As there shown a change of but a few millimeters in W varies the pressure by a matter of several thousand pounds per square inch.

To vary the clearance for the purpose noted provision is made for introducing pressure fluid to the inner faces of the end walls of the core sheath 16 so that they can be bulged outwardly, and also for introducing pressure fluid to the chamber 21 so that the inner walls of the casing 14 can be bulged inwardly. In the present instance the body 16 is cored out to form two passages 17 and 17ª which terminate at the centers of the inner faces of respective ones of the sheath end walls. Pressure fluid is supplied from some suitable source to the passage 17, in the present instance through a conduit 23 leading from the upstream side of the reducer under the control of a valve 24. To relieve the pressure in the passage 17, and thus permit the forward sheath end wall to spring back toward the core body, a relief valve 25 is provided. Similarly, pressure fluid is supplied to the passage 17ª through a conduit 23ª under the control of a valve 24ª and is relieved by a valve 25ª. Fluid supplied to the conduit 17ª serves to bulge the rear sheath wall outwardly.

Pressure fluid is also supplied to the casing chamber 21 from the conduit 23 through a branch conduit 26, under the control of a valve 27. A relief valve 28 serves to bleed pressure fluid from the chamber 21 when desired. Fluid supplied to the chamber 21 serves to bulge the inner casing wall inward to diminish the effective clearance space through the device.

If it is desired to throttle further the flow of liquid through the pressure reducer the relief valves 25 and 28 are closed and the control valves 24, 24ª and 27 opened sufficiently to introduce enough pressure fluid from the upstream side of the reducer to bulge the sheath and casing walls toward each other a desired amount. In this way the clearance space, through which the liquid flows, can be accurately controlled. To again increase this clearance space it is, of course, necessary only to close the valves 24, 24ª and 27 and to open the relief valves 25, 25ª and 28 whereupon the pressure in the line 10 and the resiliency of the theretofore bulged walls causes them to spring back toward their initial unstressed positions. If desired, the valves may be manipulated to bulge out only one or the other of the forward and rear sheath walls or only the casing walls.

In the operation of the fluid control device described above, the liquid, whose pressure or delivery rate is to be controlled, enters the device through the inlet, flowing in the direction of the arrow A. As the stream of entering liquid meets the entrance-side protrusion 19 it is spread laterally in a thinning sheet over the forward face of the core structure 12. This thin sheet of fluid flows on around the surface of the core and as it emerges from the casing 14, at the outlet 15, it recombines in an exit stream. Notable here is the fact, however, that the shape of the protrusion 20 gradually deflects the field laterally into the exit pipe so that there is no impingement of oppositely traveling streams on each other, and hence no turbulence set up at this point sufficient to produce cavitation.

Because of the greatly increased friction on the fluid stream within the device, a large part of the fluid's pressure head is dissipated in heat as it passes through the device. This heat increases the temperature of the fluid and is thus carried away by it. The efficiency of this conversion of potential to thermal energy is very high so that in cases where an increase in temperature is desired, the energy loss resulting from the use of the reducer is very small.

Figure 4:
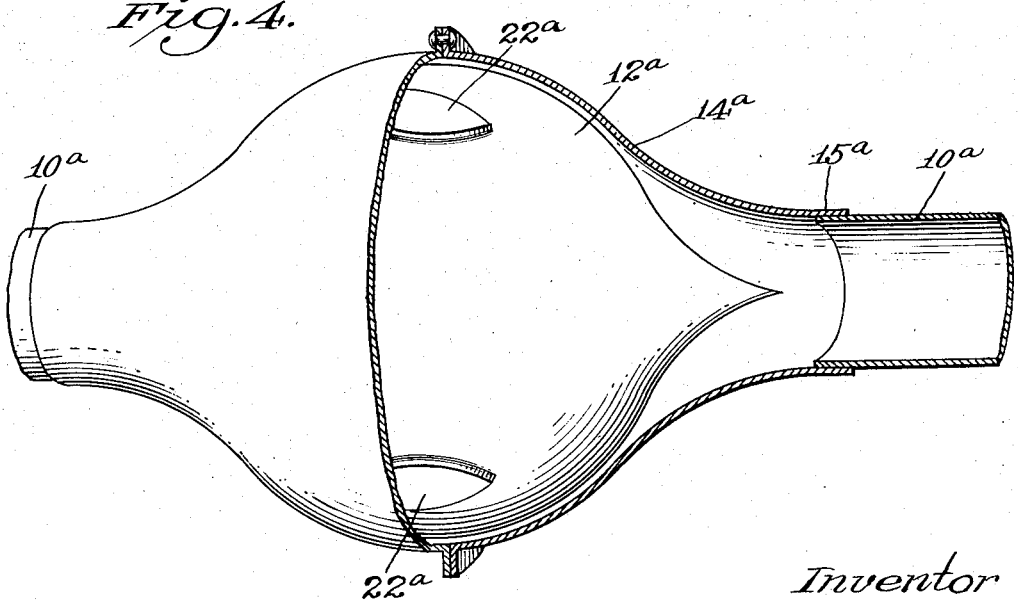
Fig. 4 is a perspective view of the reducer shown in Fig. 3 and with a portion of the casing broken away to expose the interiorly located parts.

A modified form of fluid control device, embodying the invention, has been shown in Figs. 3 and 4. This device differs from that shown in Figs. 1 and 2, primarily in that it has an inner core structure of generally spherical shape rather than disk shape and in that no provision is made for adjustment of the pressure drop effected. In brief, it comprises a core 12$^a$ of generally spherical form with smoothly tapered protrusions 19$^a$ and 20$^a$ projecting from its opposing sides. The core 12$^a$ is enclosed by a complementally shaped casing 14$^a$ interposed in a pipe 10$^a$, through which the liquid flows in the direction of the arrow A.

The core 12$^a$ is mounted within the casing 14$^a$ by peripheral bosses 22$^a$ of streamlined form. The exterior surface of the core is very smooth, being symmetrical about the longitudinal axis of the device, and constituting a surface of revolution of a smooth uninterrupted curve about this axis.

The casing 14$^a$ has alined inlet and outlet connections 11$^a$ and 15$^a$ on its opposite sides and into which the protrusions 19$^a$ and 20$^a$, respectively, project. The interior of the casing 14$^a$ is shaped so that the cross sectional area of the clearance space between it and the exterior of the core 12$^a$ is proportioned to give the desired sequence or distribution of fluid velocities and limited maximum value of the same as heretofore described in connection with the device of Figs. 1 and 2. In other words, the cross sectional area diminishes on the entering side of the device until it is such that the fluid velocity reaches a maximum of a few hundred feet per second. It will thus be seen, as in the case of the device of Figs. 1 and 2, a low velocity type pressure reducer has been provided in which the liquid flows smoothly and without turbulence so that cavitation erosion is virtually eliminated.

In Figs. 5 and 6 I have shown still a third type of fluid control device, embodying my invention. In this case the interior core structure is generally cylindrical, rather than disk shaped or spherical as in the case of the device of Figs. 1 and 3, respectively. Furthermore, the interior core structure is such as to provide a plurality of segregated concentric flow passages rather than a single one. Thus, the device of Figs. 5 and 6 comprises an inner core 12$^b$ of generally cylindrical shape with alined protrusions 19$^b$, 20$^b$ at its opposite ends which taper smoothly into the contour of the core body. This core 12$^b$ is enclosed within separator shells 30 and 31 which are, in turn, enclosed within a complementally shaped outer casing 14$^b$, the latter being interposed in a pipe 10$^b$, through which the liquid, whose pressure is to be reduced, flows in the direction of the arrow A.

As in the case of the devices described above, that of Figs. 5 and 6 has a core of smooth form which is symmetrical about the longitudinal axis of the assembly and whose exterior surface is a surface of revolution, of an uninterrupted curve, about such longitudinal axis.

The separators 30 and 31 are of tubular shell form, being necked in at their ends and present sharp leading and trailing edges, the diameters of which are so chosen as to intercept the correct portion of the smoothly flowing fluid from the line 10$^b$. In other words, the structure is such as to afford a plurality of concentric annular inlets, each of a cross sectional area proportional to the capacity of its corresponding passage so as to eliminate any radial flow of fluid at the inlets and thereby prevent turbulence. The same proportioning prevents turbulence at the outlets. The separators as well as the casing 14$^b$ are split transversely at their centers, for ease of assembly. Bosses 22$^b$ on the core and separators retain the nested parts in predetermined spaced relation.

It will thus be seen that three concentric flow passages for fluid are provided through the device. The total cross sectional area of these passages is, at any point along the same, such as to produce the desired velocity distribution heretofore described and changes in velocity likely to produce cavitation are minimized. Because of the smooth contour of the parts, however, turbulence is controlled and changes in direction likely to produce cavitation are eliminated. The multi-passage arrangement of this device affords a large capacity and, of course, an even larger number of passages may be employed if desired. It will be understood, of course, that the modified devices of both Figs. 3 and 5 are dimensioned to meet the critical conditions discussed with reference to the device of Fig. 1, the necessary clearance size being determined in the same general manner.

From the foregoing it will be apparent that I have produced a novel fluid control device characterized particularly by the minimization in the over-all change of fluid velocity, velocity gradient, rate of change of direction of flow and negative velocity gradient, which its operation entails. By virtue of these and the other characteristics noted, cavitation erosion of the parts is so far minimized as to give a rugged and very long-life device, even in heavy duty service.

I claim as my invention:

1. The method of reducing the pressure head of a confined flowing stream of fluid, which comprises, subjecting the fluid to progressively greater confinement in the course of its path of travel from an initial point of confinement to increase its velocity at a rate such as to increase the kinetic energy of the fluid substantially uniformly up to a point where the velocity reaches a maximum of only a few hundred feet per second, thereafter diminishing the confinement of the fluid but at a sufficiently slow rate that the corresponding diminution in velocity head never exceeds the pressure head, continuing such diminution of confinement until the velocity is restored to its initial value at a point coincident with the attainment of the maximum drop in fluid pressure resulting from the operations set forth, and throughout the operations set forth retaining the path of fluid flow sufficiently rectilinear that the centrifugal force acting on the fluid at any point due to any change in its direction of flow never exceeds the fluid pressure at such point.

2. The method of reducing the pressure head of a confined flowing stream of fluid, which comprises, spreading the fluid out in a thin confined sheet and recombining it in the form of a solid stream of substantially round cross section, in the course of such spreading of the fluid progressively increasing its confinement to increase its velocity at a rate such as correspondingly to increase the kinetic energy of the fluid at a substantially uniform rate, and in the course of such recombining diminishing the confinement of the fluid slowly enough that the resultant change in velocity head never exceeds the pressure head at a corresponding point in the fluid.

3. The method of reducing the pressure of a confined stream of fluid, which comprises, spreading the stream into a thin sheet between confining walls and restoring it into a solid stream of substantially round cross section, to dissipate the potential energy of the stream's pressure head by the skin friction on the thin sheet of fluid, while retaining during the spreading and recombining a relation of pressure P and velocity V for the fluid and thickness W for the sheet so that at all points displaced a distance S from the point of initiation of the spreading the rate of pressure change as the fluid progresses along its path is substantially equal to $KW^{-1.3}V^{1.7}$ where K is a constant dependent upon the particular fluid and its temperature.

4. A low velocity type fluid control device comprising, in combination, a core presenting a smooth exterior surface which is a surface of revolution, about the longitudinal axis of the core, of an uninterrupted curve; said core presenting protrusions on its opposite ends which taper smoothly from the end of the core to outwardly projecting points located on said longitudinal axis of the core; and means for confining a stream of fluid to spread laterally outward over one of said protrusions, flow in a thin sheet over the surface of the core, and recombine in an exit stream at the point of the other protrusion; said last named means including a casing enclosing the core and in which the latter is nested, the interior surface of the casing conforming closely to the contour of the exterior of the core throughout the length of the latter and being closely spaced therefrom to form a clearance space between them for flow of the fluid, and said casing having alined inlet and outlet openings in its opposite ends coaxial with said protrusions.

5. A control device for fluids comprising, in combination, a casing having an inlet and an outlet, and means within said casing defining a path from said inlet to said outlet in which the fluid is spread out in a thin sheet of gradually diminishing and subsequently increasing thickness such that the rate of change in fluid pressure as the fluid progresses along its path from inlet to outlet is substantially equal to $KW^{-1.3}V^{1.7}$ where W is the thickness of the sheet and V is the fluid velocity at any point in question and K is a constant.

6. A low velocity type fluid control device comprising, in combination, a cylindrical core having its ends smoothly tapered to oppositely projecting points, a cylindrical casing enclosing said core, a tubular separator shell within said casing and nested over said core, said shell being spaced from both the core and casing, the end portions of both said casing and shell enclosing said pointed ends of the core and being necked in to a reduced diameter, said reduced ends of the casing terminating respectively in an inlet and an outlet.

7. In a device of the type set forth, the combination of a core comprising a body with two movable end walls at respective opposite ends thereof, said core being of smooth exterior contour and its surface being a surface of revolution about its longitudinal axis, said end walls having alined outwardly projecting protrusions thereon, a casing enclosing said core in closely spaced relation thereto and having an inlet and an outlet alined with respective ones of said protrusions, and means controllable from the exterior of said casing for selectively and determinately moving individual ones of said two core end walls relative to the core body to adjust the spacing of the surfaces of said protrusions from the inner surface of the casing.

8. The method of reducing the pressure head of a confined flowing stream of fluid, which comprises, spreading the fluid out in a thin sheet of progressively diminishing depth and at the same time subjecting the fluid to progressively greater confinement during such spreading to increase its velocity at a rate such as to increase the kinetic energy of the fluid substantially uniformly up to a point where the velocity reaches a maximum of only a few hundred feet per second, whereby the potential energy of the pressure head of the fluid is diminished by dissipation of energy in skin friction incident to flowing of the fluid in such a confined thin sheet, thereafter recombining the fluid in a solid stream while coincidentally diminishing the confinement of the fluid but at a sufficiently slow rate that the corresponding diminution in velocity head never exceeds the pressure head, continuing such diminution of confinement until the velocity is restored to its initial value at a point coincident with the attainment of the maximum drop in fluid pressure resulting from the operations set forth, and throughout the operations set forth retaining the path of fluid flow sufficiently rectilinear that the centrifugal force acting on the fluid at any point due to any change in its direction of flow never exceeds the fluid pressure at such point.

9. In a device of the type set forth, the combination of a core comprising a body with two movable end walls at respective opposite ends thereof, said end walls being flexible and being spaced throughout the major portion of their areas from said body by interior chambers defined between said end walls and said body, said core being of smooth exterior contour and its surface being a surface of revolution about its longitudinal axis, said end walls having alined outwardly projecting protrusions thereon, a casing enclosing said core in closely spaced relation thereto and having an inlet and an outlet alined with respective ones of said protrusions, and means for supplying pressure fluid selectively to said chambers for bulging said core end walls outward relative to the core body to adjust the spacing of the surfaces of said protrusions from the inner surface of the casing.

THOMAS C. POULTER.